(12) United States Patent
Watanabe et al.

(10) Patent No.: US 7,013,371 B2
(45) Date of Patent: Mar. 14, 2006

(54) DATA TRANSFER CONTROL SYSTEM

(75) Inventors: Takashi Watanabe, Odawara (JP); Kenzo Tabata, Odawara (JP)

(73) Assignee: Hitachi, Ltd., Tokyo (JP)

( * ) Notice: Subject to any disclaimer, the term of this patent is extended or adjusted under 35 U.S.C. 154(b) by 368 days.

(21) Appl. No.: 10/639,996

(22) Filed: Aug. 13, 2003

(65) Prior Publication Data

US 2004/0199733 A1    Oct. 7, 2004

(30) Foreign Application Priority Data

Apr. 1, 2003   (JP)   .............................. 2003-097696

(51) Int. Cl.
*G06F 13/00*   (2006.01)

(52) U.S. Cl. ....................... 711/161; 711/162; 707/202; 714/6

(58) Field of Classification Search ................ 711/100, 711/154, 161, 162; 707/202, 203, 204; 714/6
See application file for complete search history.

(56) References Cited

U.S. PATENT DOCUMENTS

| | | | |
|---|---|---|---|
| 4,757,396 A * | 7/1988 | Ishiguro et al. ............... 360/69 |
| 5,809,527 A * | 9/1998 | Cooper et al. ............... 711/133 |
| 5,920,572 A * | 7/1999 | Washington et al. ......... 370/535 |
| 6,052,797 A | 4/2000 | Ofek et al. |
| 6,088,697 A | 7/2000 | Crockett et al. |
| 6,145,068 A * | 11/2000 | Lewis ......................... 711/170 |
| 6,499,091 B1 * | 12/2002 | Bergsten ..................... 711/162 |
| 6,578,120 B1 * | 6/2003 | Crockett et al. ............. 711/162 |
| 6,643,750 B1 | 11/2003 | Achiwa et al. |
| 2003/0005235 A1 | 1/2003 | Young |
| 2003/0088592 A1 | 5/2003 | Innan |
| 2003/0177321 A1 | 9/2003 | Watanabe |
| 2003/0182526 A1 * | 9/2003 | Mikkelsen et al. .......... 711/162 |

FOREIGN PATENT DOCUMENTS

JP      11-015604      1/1999

* cited by examiner

*Primary Examiner*—Tuan V. Thai
(74) *Attorney, Agent, or Firm*—Mattingly, Stanger, Malur & Brundidge, P.C.

(57) ABSTRACT

A storage system that realizes data duplication between a master storage and a remote storage by performing a remote data transfer is provided. The storage system monitors the amount of write data from a host apparatus to the master storage. If as a result of monitoring, the amount of write data is found to exceed a predetermined value, the data transfer to the remote storage is automatically halted and a differential management of updated data takes place within the master storage using a differential bitmap.

15 Claims, 3 Drawing Sheets

DATA TRANSFER CONTROL SYSTEM

The basic foreign Application filed Apr. 1, 2003, No. 2003-097696 in Japan is hereby incorporated by reference.

BACKGROUND OF THE INVENTION

1. Field of the Invention

The present invention relates to a data transfer control system, and more particularly to a data transfer control in a system that realizes data multiplication by copying data among storage systems.

2. Related Background Art

In recent years, the necessity of disaster recovery systems has been rising for computer systems in order to avoid data loss in the event of a disaster such as terrorism and earthquake. To this end, data from a host is generally written to a master storage as well as to a remote storage installed at a remote location, thereby realizing data duplication (or data multiplication in a broader sense). As a result, even when a master system cannot be operated due to a disaster, operations can be resumed shortly by switching to a remote system.

In the duplication system described, a remote copy is meaningful only when the remote system is operating normally and a backup copy to the remote storage can be made at all times. A failure of equipment between storage systems or an instruction from a user, for example, can make it temporarily impossible to transfer data between storage systems, which results in a suspension of data duplication. Such a state is called a "suspended state." Even during the suspended state, write I/O data from the host continues to be written to storage media of the master storage and data is updated constantly. Updates to data written to the storage media of the master storage are managed by a so-called "differential bitmap," which expresses all storage regions of the storage media in a bitmap format and flags bits that correspond to updated regions (i.e., differential data regions).

When the equipment recovers from the failure, the suspended state is canceled, and when the remote system returns to its normal state, a processing to transfer differential data indicated on the differential bitmap from the master storage to the remote storage and recover the remote storage to a completely mirroring state (i.e., a recovery copy processing) takes place.

When a major failure occurs in the master system during the recovery copy processing, a situation in which data consistency cannot be maintained even in the remote system may occur.

A technology to solve such a problem has been proposed. When executing a recovery copy processing (in other words, when a recovery copy mode begins), before sending differential data from a master system to a remote system, old data in disk drive devices that corresponds to the differential data is saved to a different region of a spare disk; by subsequently storing the differential data to a target storage region of the disk drive devices, the consistency of the copy data is maintained.

However, when the master system becomes unusable for whatever reason, the conventional technology requires some waiting time until the recovery copy processing ends, which requires some time before system operations can be resumed.

Furthermore, when there is a large amount of write I/O data sent to the master storage and when the master storage and the remote storage are far apart or when there is insufficient band in a data transfer line, the response time to the host for the large amount of write I/O data can deteriorate considerably in data duplication state, regardless of whether the data transfer to the remote storage is synchronous or asynchronous.

SUMMARY OF THE INVENTION

The present invention relates to a data transfer system that makes a control of data transfer to the remote storage easy and that prevents the deterioration of the response time.

The present invention also relates to a data transfer system that makes a transition control from a suspended state to a data duplication state easy and improves the fault tolerance during the transition in a storage system that performs remote data transfer.

In accordance with an embodiment of the present invention, in a data transfer control method in which data is transferred from a host apparatus to a first storage system and stored in a first storage apparatus, and also the data is transferred from the first storage system via an interface to a second storage system and stored in a second storage apparatus in order to duplicate data, the method comprises the steps of placing the first storage system in a suspended state to halt data transfer to the second storage system; notifying from the first storage system to the second storage system a request to secure data in the suspended state; upon receiving the notice of the request to secure data, storing data that is in the second storage apparatus to another storage region separate (a third storage apparatus) from the second storage apparatus but still within the second storage system; and, upon the first storage system's receiving a notice that storing the data to the other storage region from the second storage region has been completed, and upon the cancellation of the suspended state, transferring from the first storage system to the second storage system data written to and updated in the first storage apparatus during the suspended state.

In accordance with a preferred embodiment of the present invention, a system comprises a control module that controls to store in a first storage apparatus write data received by a master storage; a remote transfer control module that transfers the data received by the master storage to a remote storage; a module that monitors the amount of write data received by the master storage from a host apparatus; a transition control module that shifts the system to a suspended state if as a result of monitoring through the monitoring module the data amount received is determined to be greater than a predetermined value; and a differential bitmap that manages differentials of data stored in the first storage apparatus within the master storage after shifting to the suspended state; wherein data transfer to the remote storage using the remote transfer control module is halted in the suspended state, and when the suspended state is canceled based on an instruction from the transition control module, differential data managed by the differential bitmap is transferred to the remote storage through the remote transfer control module.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Figure 1:
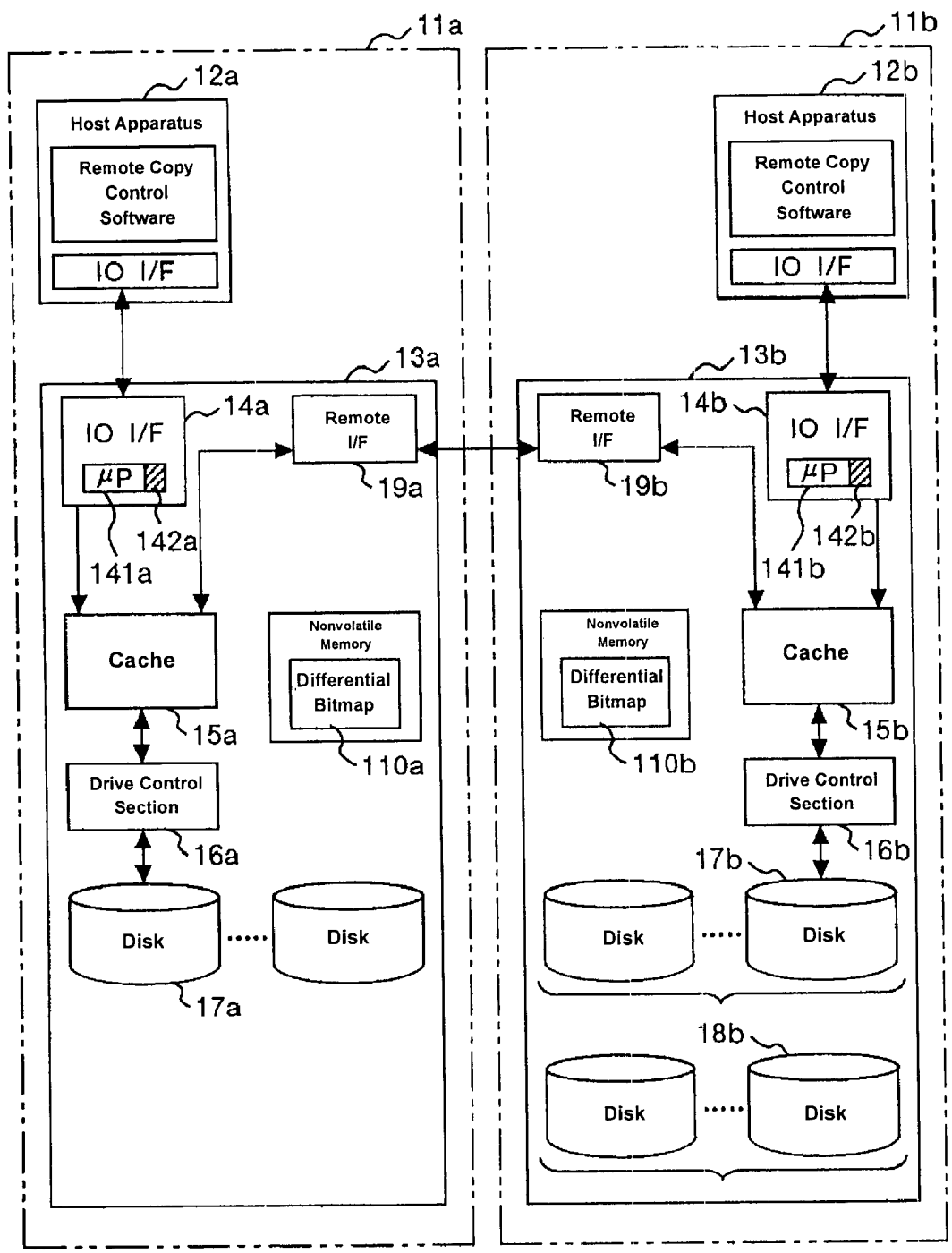
FIG. 1 shows an example of a configuration of a remote data transfer control system in accordance with one embodiment of the present invention.

Embodiments of the present invention are described with reference to the accompanying drawings. FIG. 1 is a diagram of the configuration of a remote data transfer control system as applied to a disaster recovery system in accordance with one embodiment of the present invention.

The remote data transfer control system includes a master system 11a and a remote system 11b, both of which may have configurations that are virtually identical. The systems 11a and 11b comprise host computer apparatuses (hereinafter called "host apparatuses") 12a and 12b, respectively, and a master storage 13a and a remote storage 13b, respectively. Data is transferred from the master storage 13a to the remote storage 13b for copying.

The host apparatuses 12a, 12b are data generation sources and have software for remote copy control. The host apparatuses 12a and 12b issue write requests (i.e., write I/O requests) and send write (write I/O) data via their respective I/O interfaces (hereinafter called "I/O I/F").

The master storage 13a and the remote storage 13b are provided with I/O I/Fs 14a and 14b, respectively, to connect with the host apparatuses 12a and 12b, respectively. A remote I/F 19a is connected to a remote I/F 19b via a public telephone line or a dedicated line, and copy data is transferred through the remote I/Fs 19a and 19b (i.e., transfer control module).

The I/O I/Fs 14a and 14b are provided with microprograms ($\mu$P) 141a and 141b, respectively, for controlling data transfer with the host apparatuses 12a and 12b, respectively, and for controlling data transfer between the remote I/Fs 19a and 19b. As one of the features of the present invention, the microprograms 141a and 141b are provided with a function to monitor the amount of write data from the host apparatuses 12a and 12b, respectively. This function is called monitoring tasks 142a and 142b or data amount monitoring sections in this example; this function will be described in detail later.

Caches 15a and 15b temporarily store write data. Data stored in the cache 15a is transferred to the remote system 11b via the remote I/Fs 19a, 19b as copy data and stored in the cache 15b.

The master storage 13a and the remote storage 13b have disks 17a (a primary volume in a storage remote copy function) and disks 17b (a secondary volume in a storage remote copy function), respectively, both with an array configuration; drive control sections 16a and 16b control read/write of data to and from the disks 17a and 17b, respectively. Data temporarily stored in the caches 15a and 15b is stored in the disks 17a and 17b, respectively, as a result of a control by the drive control sections 16a and 16b, respectively. Data stored in the disks 17a and 17b is read and transferred to the host apparatus 12a and 12b, respectively, via the I/O I/Fs 14a and 14b, respectively. In accordance with the present embodiment, the remote storage 13b is additionally provided with disks 18b with an array configuration. In this example, the disks 17a, 17b and 18b are treated as physical disks, but they may be defined as logical disks. Further, the caches 15a, 15b and the disks 17a, 17b and 18b are sometimes called "storage resources."

The disks 18b are used in a suspended state to save data that is in the disks 17b. In other words, the disks 17b become a primary volume, while the disks 18b become a secondary volume, when a copy function takes place internally within the remote storage 13b.

The master storage 13a and the remote storage 13b may be nonvolatile memories that store differential bitmaps 110a and 110b, respectively. The differential bitmaps 110a and 110b reflect the update status of write data to the disks in the suspended state. For example, each bit on the differential bitmaps 110a and 110b corresponds to a track on a disk, such that when data recorded on the track is updated, the bit that corresponds to the track is flagged "1." When the suspended state is canceled, data recorded on the track on the disks 17a that corresponds to the flag "1" on the differential bitmap 110a is transferred to the remote storage 13b via the remote I/Fs 19a and 19b (recovery copy) in order to recover the data stored on the disks 17b of the remote storage 13b to a mirroring state.

To describe in detail the monitoring task, the monitoring tasks 142a and 142b monitor the amount of write data per unit time (sec) sent from the host apparatuses 12a and 12b, respectively. If the amount of write data exceeds a predetermined value (a threshold) in the monitoring by the monitoring task 142a, the remote data transfer is halted and a transition to a suspended state takes place. The I/O I/F 14b of the remote system 13b obtains control information sent via the remote I/Fs 19a and 19b and becomes aware of the transition to the suspended state. In the present example, control information is, for example, a data securing request instruction.

The threshold is determined by taking into account the capacity of the cache 15a and the data transfer capacity per unit time (sec) of the I/O I/F 14a and the remote I/Fs 19a and 19b. For example, if the amount of write data transferred via the I/O I/F 14a is greater than the capacity of the cache 15a or greater than the transfer capacity of the remote I/F 19a, an overflow results. In view of this, the threshold is determined by taking into account the percentage of the capacity of the cache 15a and the percentage of the transfer capacity of the remote I/F 19a that would not cause an overflow. The reason for the master storage 13a and the remote storage 13b to have similar configurations and for each to be provided with a monitoring task is that the systems may be switched, such that the remote storage 13b would act as a master storage.

Figure 2:
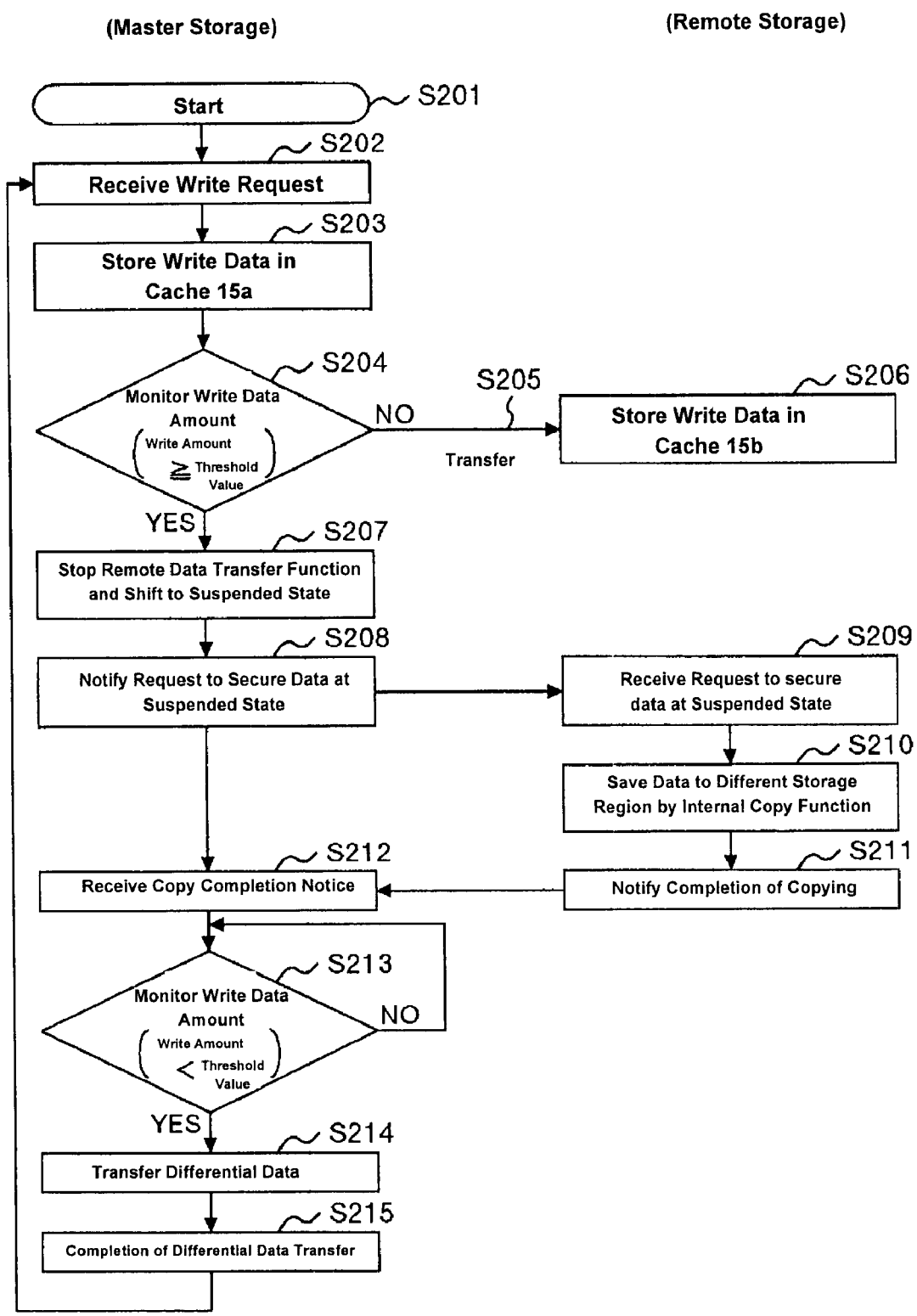
FIG. 2 shows a flowchart of a control operation of a remote data transfer in accordance with one embodiment of the present invention.

The following is a description of a control operation in the remote data transfer with a reference to FIG. 2.

The host apparatus 12a issues a write request and transfers write data to the master storage 13a.

In the master storage 13a, the I/O I/F 14a receives the write request from the host apparatus 12a (S202). The write data received is stored in the cache 15a (S203). The storage of the data is guaranteed when the data is stored in the cache 15a, and the data is stored on the disks 17a via the drive control 16a.

The amount of write data received is monitored by the monitoring task 142a of the I/O I/F 14a (S204). If the amount of write data is less than the threshold, the data is transferred to the remote storage 13b via the remote I/Fs 19a, 19b to be duplicated (S205), and written to the cache 15b (S206).

Next, just as the data was written to the disks 17a in the master storage 13a, the write data transferred to the remote storage 13b is written from the cache 15b to the disks 17b.

On the other hand, if the monitoring task 142a determines that the amount of write data is greater than the threshold (S204: Yes), the remote data transfer function is immediately halted at this point and a transition to a suspended state takes place (S207). In other words, data duplication to the remote storage 13b is immediately halted. This takes place as a result of a control by the microprogram 141a of the I/O I/F 14a.

There are data write requests from the host apparatus 12a even in the suspended state; consequently, data continues to be written to the cache 15a and the disks 17a in the master storage 13a, and data stored in the past are updated. Such data updates in the suspended state are managed by the differential bitmap 110a.

When the transition to the suspended state takes place, a data securing request is immediately sent from the master storage 13a to the remote storage 13b via the remote I/Fs 19a and 19b as a result of a control by the microprogram 141a of the I/O I/F 14a (S208). The data securing request is an instruction to save data that was stored in the remote storage 13b as of immediately before the transition to the suspended state to another storage region within the remote storage 13b.

When the I/O I/F 19b in the remote storage 13b receives the data securing request (S209), an internal copy function is executed in the remote storage 13b and data is saved in another storage region within the remote storage 13b (S210). The operation of the copy function takes place by having the drive control section 16b, which is operated by an instruction issued by the I/O I/F 19b, cause all data stored in the disks 17b to be transferred to and stored on the disks 18b (S210).

When copying data to the disks 18b is completed, the remote I/O I/F 19b sends a copy end notice (S211). The copy end notice sent from the remote I/O I/F 19b is received by the remote I/O I/F 19a of the master storage 13a, and this notifies the master storage 13a that saving data in the remote storage 13b has been completed (S212).

Although the suspended state may still be continuing, the monitoring task 142a determines the relationship between the amount of write data and the threshold upon receiving the copy end notice (S213). If as a result of the determination the amount of write data is found to be less than the threshold, the suspended state is determined to have been canceled and a recovery copy processing begins (S214). The recovery copy processing is a control for establishing data duplication state between the master storage 13a and the remote storage 13b by transferring to the remote storage 13b the differential data of data updated in the master storage 13a. In other words, parts of the disks 17a in which data was updated during the suspended state are managed by the differential bitmap 110a; data on tracks that were updated and found by referring to flags on the differential bitmap 110a are transferred sequentially to the remote storage 13b and stored on the corresponding parts of the disks 17b. When all differential data are transferred to the remote storage 13b (S215), a data duplication state is re-established. Any write data sent to the master storage 13a during the transfer of the differential data is immediately transferred to the remote storage 13b.

By saving data to another storage region within the remote storage 13b in this way, even if a failure occurs at the site of the master system 11a and the recovery copy processing is interrupted during the transfer of differential copy data (the recovery copy) from the master storage 13a, the operation can be switched immediately to the remote system 11b to allow a rapid transition of operations to the remote system 11b. In addition, data saved on the disks 18b can be used to quickly resume data duplication.

According to the embodiment example described above, in a storage system having a remote data transfer function for data duplication, by having a monitoring task monitor the amount of write data to a master system, remote transfer function controls, such as a control to make a transition to a suspended state and a control to make a transition to a data duplication state, can take place automatically based on the monitoring result. This can reduce deterioration in the response time to write requests from the host apparatus.

Figure 3:
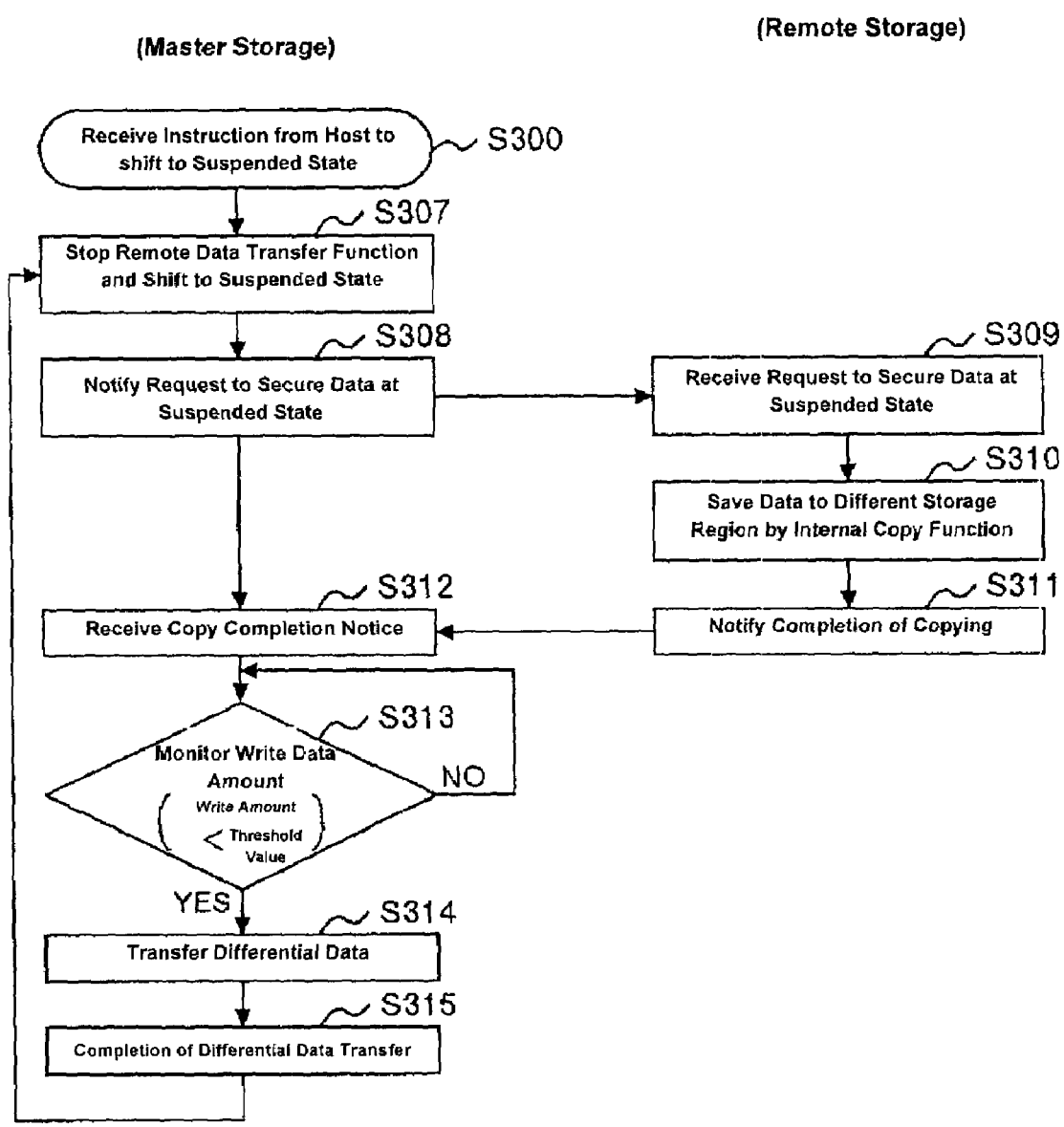
FIG. 3 shows a flowchart of a control operation of a remote data transfer in accordance with another embodiment of the present invention.

The following is a description of a control operation for a remote data transfer according to another embodiment example with a reference to the flowchart in FIG. 3.

The difference in operation steps in FIG. 3 from the operation steps in FIG. 2 is in step S300. Steps S307 through S315 are the same as the steps S207 through S215 in FIG. 2.

In the example in FIG. 3, instead of monitoring the amount of write I/O data from the host apparatus 12a (S204) as shown in FIG. 2, a transition to a suspended state is executed based on an instruction from the host apparatus. In this case, the microprogram 141a of the I/O I/F 14a does not have to wait for the monitoring task 142a to perform its function, but it must be provided with a function to determine whether there has been an instruction from the host apparatus 12a to shift to a suspended state.

A rather forceful transition to a suspended state based on an instruction from the host apparatus 12a is useful, for example, for the maintenance of the system based on an instruction from a user, or when establishing a backup point. In such cases, when the user inputs an instruction to the host apparatus 12a, the host apparatus 12a makes a judgment about the instruction input and issues an instruction to the master storage 13a via the I/O I/F. When the I/O I/F 14a of the master storage 13a receives the instruction (S300) and makes a determination, a transition to the suspended state takes place (S307).

Many modifications can be made without departing from the present invention.

Immediately after a transition to a suspended state, the copy destination of data stored in the physical disks 17b is not limited to the physical disks 18b, and instead may be another storage apparatus such as a magnetic tape apparatus provided within the remote system 11b.

Furthermore, although the master storage 13a and the remote storage 13b are made of disk array apparatuses, for example, they may instead have other configurations, such as single disk drives or semiconductor storage devices.

Although the monitoring task 142a is realized by the microprogram 141a within the I/O I/F 14a according to the example in FIG. 1, the function of the monitoring task may be realized by hardware. In this case, for example, the function can be realized by a circuit combining a counter for counting the amount of write I/O data, a register for storing the threshold, and a comparator for comparing the two.

As a modified example of FIG. 2 or FIG. 3, the sequence of steps S212 and S213 may be reversed. In this case, the comparison of the amount of write I/O data to the threshold can be performed periodically, and the data copy end notice awaited when the amount of write data is found as a result of the determination to be less than the threshold.

Furthermore, the control described in FIG. 2 and the control described in FIG. 3 may be combined. When they are combined, it should be understood that there would be two reasons for shifting to a suspended state, namely a determination made in step S204 and an instruction from the host apparatus (S300).

According to the present invention, a control to shift to a suspended state based on the monitoring of the amount of write data from a host apparatus or on an instruction from the host apparatus can take place easily in a master system. Further, fault tolerance improves during a transition to a data duplication state from the suspended state, due to the fact that data is automatically secured in the remote storage after a transition to the suspended state. For example, even when a disaster occurs at the site of the master system, operations can be handed over to a remote system and resumed shortly.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A data transfer control system including a master storage having a first storage apparatus and a remote storage having a second storage, the data transfer control system comprising:
    a control module that controls to store in the first storage apparatus write data received by the master storage;
    a remote transfer control module that transfers the data received by the master storage to the remote storage;
    a monitoring module that monitors the amount of write data received by the master storage;
    a transition control module that shifts the master storage to a suspended state if the data amount received is determined by the monitoring module to be greater than a predetermined value; and
    a differential bitmap that manages differentials of data stored in the first storage apparatus of the master storage after the master storage shifts to the suspended state,
    wherein data transfer to the remote storage using the remote transfer control module is halted in the suspended state based on an instruction from the transition control module.

2. A data transfer control system according to claim 1, wherein differential data managed by the differential bitmap is transferred to the remote storage when the suspended state is canceled based on an instruction from the transition control module.

3. A data transfer control system according to claim 2, further comprising a third storage apparatus within the remote storage independently of the second storage apparatus, and a control module that controls to store data already stored in the second storage apparatus to the third storage apparatus immediately after the suspended state is started.

4. A data transfer control system including a master storage and a remote storage for data, the data transfer control system comprising:
    a remote data transfer module that performs a remote data transfer between the master storage and the remote storage for data duplication;
    a monitoring module that monitors the amount of write data to the master storage;
    a transition control module that places the master storage in a suspended state wherein data transfer to the remote storage is automatically halted and performs a differential management of updated data within the master storage, if the amount of write data is found to exceed a predetermined value by the monitoring module;
    wherein differential data managed by a differential bitmap is transferred to the remote storage through the remote data transfer module when the suspended state is canceled based on an instruction from the transition control module.

5. A data transfer control system according to claim 4, further comprising the differential bitmap that is used in a differential management to manage differentials of data stored in the master storage after the master storage shifts to the suspended state.

6. A data transfer control system according to claim 4, wherein the master storage includes a first storage apparatus that stores data transferred from a host apparatus, and the remote storage includes a second storage apparatus that stores the data transferred from the first storage apparatus, a third storage apparatus independently of the second storage apparatus, and a control module that controls to store data already stored in the second storage apparatus to the third storage apparatus immediately after the suspended state is started.

7. A data transfer control method comprising:
    a first storage step of storing data received by a master storage in a first storage apparatus within the master storage;
    a second storage step of transferring the data received by the master storage to a remote storage and storing the data in a second storage apparatus in the remote storage;
    a monitoring step of monitoring the amount of write data received by the master storage;
    a step of shifting the master storage to a suspended state if the data amount received is determined by the monitoring step to be greater than a predetermined value;
    a managing step of managing data stored in the first storage apparatus in the master storage with a differential bit map after the master storage shifts to the suspended state;
    a step of halting data transfer to the remote storage in the suspended state;
    a step of transferring differential data managed by the differential bit map to the remote storage when the suspended state is released, and
    a step of storing data already stored in the second storage apparatus to a third storage apparatus within the remote storage immediately after the suspended state is started.

8. A data transfer control method for controlling a system including a master storage and a remote storage for data, the data transfer control method comprising:
    a remote data transfer step of performing a remote data transfer between the master storage and the remote storage for data duplication;
    a monitoring step of monitoring the amount of write data to the master storage;
    a transition control step of placing the master storage in a suspended state wherein data transfer to the remote storage is automatically halted and performing a management of updated data within the master storage with a differential bit map, if the amount of write data is found to exceed a predetermined value by the monitoring step, wherein differential data managed by the differential bitmap is transferred to the remote storage when the suspended state is canceled.

9. A data transfer control method in which data is transferred from a host apparatus to a first storage system and stored in a first storage apparatus, and also the data is transferred from the first storage system via an interface to a second storage system and stored in a second storage apparatus in order to duplicate data, the method comprising the steps of:

placing the first storage system in a suspended state to halt data transfer to the second storage system;

notifying from the first storage system to the second storage system a request to secure data in the suspended state;

upon receiving the request to secure data, storing data that is in the second storage apparatus to another storage region independent of the second storage apparatus but within the second storage system;

transferring from the first storage system to the second storage system data written to and updated in the first storage apparatus during the suspended state, after the first storage system received a notice that storing the data to the another storage region from the second storage region has been completed, and the suspended state has been cancelled;

monitoring the amount of data transferred from the host apparatus to the first storage system;

storing data in the first storage apparatus when the amount of data received by the first storage system is determined in the step of monitoring to be smaller than a predetermine set value; and shifting to the suspended state when the amount of data received by the master storage is determined in the step of monitoring to be greater than a predetermined set value.

10. A data transfer control method according to claim 9, further comprising a step of managing data written in the first storage apparatus within the master storage with a differential bit map, after the suspended state is started.

11. A data transfer control method according to claim 10, wherein differential data managed by the differential bitmap is transferred to the remote storage when the suspended state is canceled.

12. A data transfer control method according to claim 9, further comprising a step of canceling the suspended state when the amount of data received by the first storage system is determined in the suspended state and in the step of monitoring to be smaller than the predetermine set value.

13. A data transfer control method according to claim 9, further comprising a step of receiving an instruction from the host apparatus to make a transition to the suspended state, and a step of stopping the first storage system to transfer data to the second storage system when the first storage system receives the instruction.

14. A storage system comprising:

a master storage and a remote storage, wherein the master storage comprises:

a first I/O interface that performs a data transfer control with a host apparatus;

a first cache that temporarily stores write data received from the host apparatus through the first I/O interface;

a first storage apparatus that stores the data stored in the first cache;

a memory that stores a bitmap for managing an update status of data stored in the first storage apparatus;

a first remote interface that transmits to the remote storage write data sent from the host apparatus and received by the master storage;

a microprogram provided in the first I/O interface, the microprogram having a judgment function to judge whether the amount of write data received from the host apparatus is greater or smaller than a predetermined value;

a module that shifts the master storage to a suspended state and controls the first remote interface to stop transmitting data to the remote storage when the amount of data received by the first I/O interface is determined as a result of judging by the judgment function to be greater than the predetermined value; and a module that sends a data securing request from the first remote interface to the remote storage to secure data immediately after the master storage shifts to the suspended state.

15. A storage system according to claim 14, wherein the remote storage comprises:

a second remote interface that receives data transmitted from the first remote interface;

a second cache that temporarily stores the data received through the second remote interface;

a second storage apparatus that stores the data stored in the second cache;

a third storage apparatus provided in the remote storage independently of the second storage apparatus; and a module that, upon receiving a data securing request through the second remote interface, stores data stored in the second storage apparatus to the third storage apparatus.

* * * * *